United States Patent [19]

Pearce et al.

[11] 3,879,023

[45] Apr. 22, 1975

[54] METHOD FOR ABSORBING AND RELEASING ENERGY

[75] Inventors: Roscoe L. Pearce, Midland; David F. Wisniewski, Auburn, both of Mich.

[73] Assignee: The Dow Chemical Company, Midland, Mich.

[22] Filed: Dec. 13, 1973

[21] Appl. No.: 424,265

[52] U.S. Cl. .............................. 267/64 R; 188/269
[51] Int. Cl. ............................................. F16f 5/00
[58] Field of Search..... 188/269; 267/182, 173, 64 R 267/64 R

[56] References Cited
UNITED STATES PATENTS

| | | | |
|---|---|---|---|
| 2,282,652 | 5/1942 | Henning | 188/269 |
| 2,774,447 | 12/1956 | Bourcier De Carbon | 188/269 |
| 2,965,074 | 12/1960 | Williamson | 188/269 |

FOREIGN PATENTS OR APPLICATIONS

| | | | |
|---|---|---|---|
| 549,727 | 11/1957 | Canada | 188/269 |

Primary Examiner—James B. Marbert
Attorney, Agent, or Firm—V. Dean Clausen; Lloyd S. Jowanovitz

[57] ABSTRACT

In the present method the pressure required to dissolve a gas phase in a liquid phase provides a resistance which will absorb energy. The liquid phase is a substance which is in a liquid state at atmospheric pressure and at temperatures between about −50° to + 150°F. The gas phase is a substance which is a gas at these temperatures, but which is chemically inert to the liquid and essentially insoluble in the liquid at atmospheric pressure. In operation, the gas-liquid phase is stored in a closed container and a positive pressure is applied to the gas-liquid phase. When the applied pressure exceeds about one atmosphere of pressure, part of the gas phase will partially dissolve in the liquid phase. As the gas dissolves in the liquid it provides a cushion for gradual absorption of the applied energy. When the applied pressure on the gas-liquid phase is released, so that the system returns to atmospheric pressure, the gas will come out of solution and the system is again ready to absorb energy.

8 Claims, 2 Drawing Figures

PATENTED APR 22 1975    3,879,023

3,879,023

METHOD FOR ABSORBING AND RELEASING ENERGY

BACKGROUND OF THE INVENTION

The invention relates broadly to a method for absorbing and releasing energy. More specifically, the invention covers a method in which the pressure required to dissolve a gas phase in a liquid phase provides a resistance which will absorb energy.

Many systems in use today require absorption of energy to cushion the force of a direct impact. Common examples of devices required to cushion an impact force are the bumper assemblies and suspension systems on vehicles, such as automobiles. In most of these systems the impact energy is absorbed and dissipated either by a heavy duty spring or by a cylinder containing hydraulic fluid, in which the fluid is forced through an orifice by a slidable plunger in the cylinder. Certain disadvantages are inherent in both of these types of energy absorbers. For example, in a vehicle bumper system, if a spring system is used, there will be a sudden release of most of the energy as the spring retracts. In a vehicle shock absorber system, which utilizes a hydraulic cylinder, the viscosity of the fluid will vary considerably with temperature. The desired cushioning effect of the shock absorber, therefore, is very difficult to control.

SUMMARY OF THE INVENTION

According to the method of the present invention, the pressure required to dissolve a gas phase in a liquid phase offers a resistance which will absorb energy. Initially, the gas-liquid phase is stored in a closed container. The liquid phase comprises a substance which is a liquid at atmospheric pressure and at a temperature range of about $-50°$ to $+150°F$. The gas phase is a substance which will remain a gas at atmospheric pressure and at the recited temperature range. In addition, the gas phase must be chemically inert to the liquid phase and essentially insoluble in the liquid at atmospheric pressure. By applying a positive pressure to the gas-liquid phase, which is above about one atmosphere of pressure, the gas will partially dissolve in the liquid. The resistance of the dissolving gas permits gradual energy absorption. Release of the pressure restores the system to atmospheric pressure, so that it is again ready for absorbing energy.

DESCRIPTION OF A PREFERRED EMBODIMENT

Figure 1:
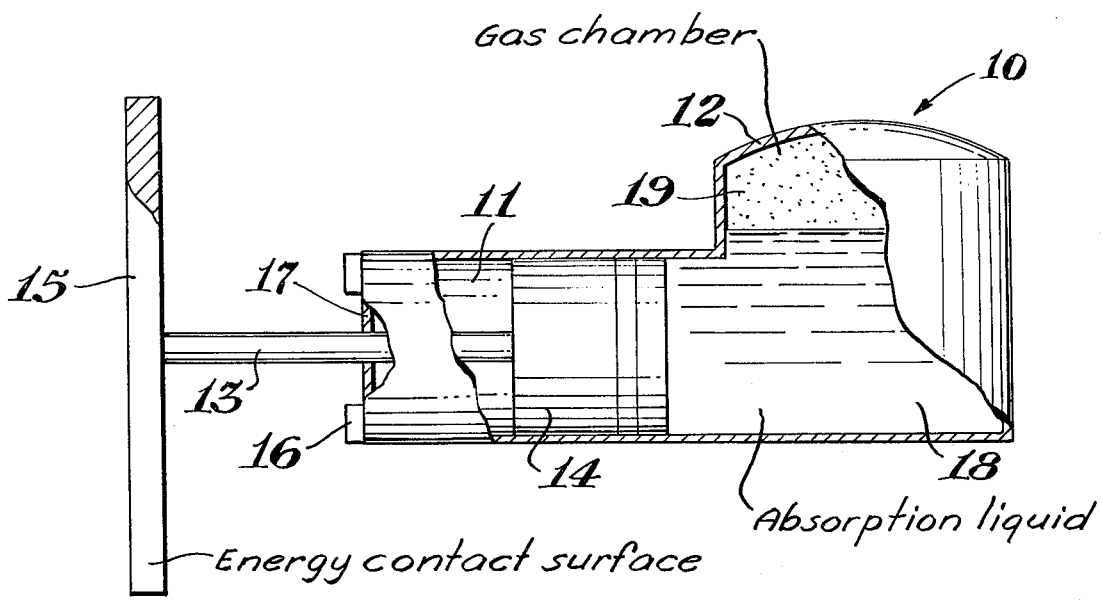
FIG. 1 is a side elevation view, partly in section, of one embodiment of an energy absorbing device for practicing the method of this invention.

Reference is made to the energy absorbing device shown in FIG. 1. The major component of the energy absorbing device is a closed container, indicated generally by numeral 10. Basically, container 10 is made up of a cylinder portion 11 and a chamber portion 12. Fitted within cylinder 11 is a slidable piston. The piston is made up of a piston rod 13, which is connected at one end into a piston head 14.

At the opposite end from piston head 14, the piston rod 13 is fastened to an energy contact surface, as defined by a plate member 15. A stop ring 16 is mounted on the outside periphery of the end wall 17 of cylinder 11. The energy absorbing means is provided by a liquid phase 18 and a gas phase 19, which is sealed within container 10. As shown, in the liquid phase 18 occupies part of chamber portion 12 and cylinder 11, while the gas phase 19 occupies the space in chamber 12 above the surface of liquid 18.

In practice, it is preferred that the gas phase 19 comprise at least two different gases. Both gases should be essentially insoluble in the liquid phase at a temperature between about $-50°$ and $150°F$., and at atmospheric pressure. At least one of the gases, however, should be highly soluble in the liquid at the same temperature, but at a higher pressure. The other gas, however, should have a very low solubility in the liquid, such that it will remain essentially insoluble in the liquid under the same temperature and pressure conditions.

The practice of this invention will be illustrated by describing a typical operation of the device 10. For a typical operation, assume that a lateral impact force above about one atmosphere of pressure is directed against plate 15. The applied force will shove piston head 14 forward, to push liquid 18 upwardly into the gas phase 19 in chamber portion 12. As the level of liquid 18 rises in chamber 12, it will compress the gas phase 19.

The resulting pressure increase will eventually force all of the higher solubility gas into the liquid. At the same pressure level, however, only a small amount of the low solubility gas will dissolve in the liquid 18. The low solubility gas phase which remains above the liquid phase, therefore, will resist further lateral movement of piston head 14. This resistance factor, therefore, provides a cushion against the impact force on plate 15. If the impact force on plate 15 should force the piston head 14 too far forward, however, the stop ring 16 will prevent the plate 15 from slamming against the end wall 17 of cylinder 11.

Once the force against plate 15 is completely released, the applied pressure in chamber 12 will return to the level of atmospheric pressure. When this occurs, the lower pressure above the liquid phase will allow the dissolved gas to come out of solution. The energy absorbing device will then be restored to its original condition, so that it can absorb another impact force.

Figure 2:
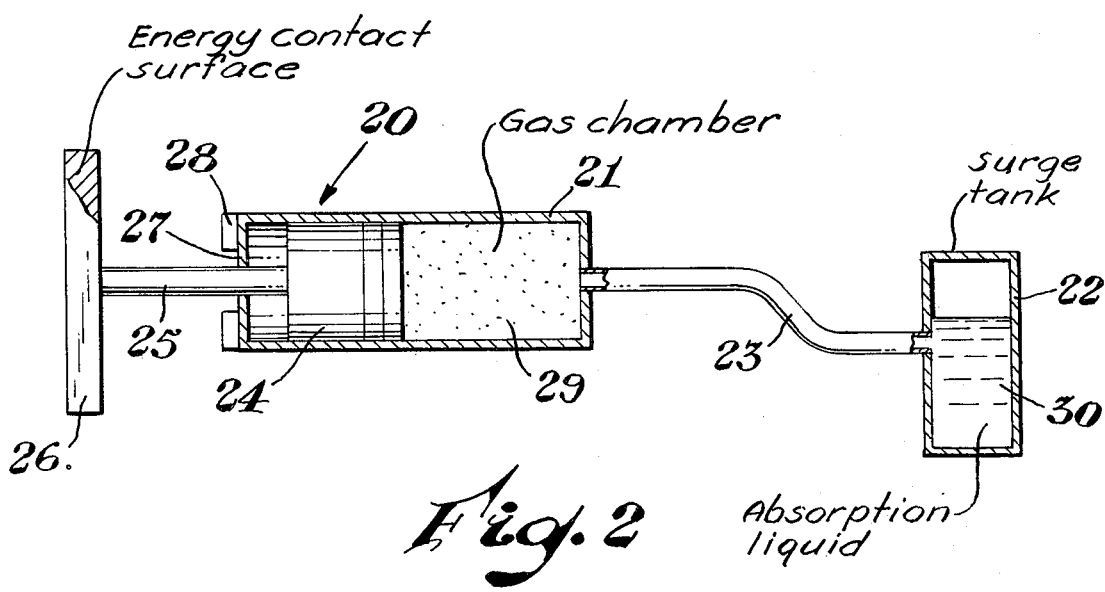
FIG. 2 is a side elevation view, partly in section of a second embodiment of an energy absorbing device, according to this invention.

In FIG. 2 is shown a second embodiment of an energy absorbing device, as indicated generally by numeral 20. Basic components of the device 20 include a closed cylinder 21, which is connected by a supply line 23 to a closed surge tank 22. A slidable piston, which includes a piston head 24 and piston rod 25, is fitted into the cylinder 21. A plate 26, which provides an energy contact surface, is connected to piston rod 25 at the opposite end from head 24. Attached to the outside edge of end wall 27 of cylinder 21 is a circular stop ring 28.

In device 20 the energy absorbing means is provided by a gas phase 29 and a liquid phase 30. The gas phase 29 is sealed within cylinder 21 and the liquid phase 30 is sealed within surge tank 22. A suitable gas-liquid phase for device 20 should have properties similar to the gas-liquid phase employed in device 10. For example, the gas phase 29 should comprise at least one gas which has high solubility in the liquid 30 at a given pressure and temperature, and one gas which has low solubility in the liquid at the same temperature and pressure.

In a typical operation of device 20, assume that an impact force higher than about one atmosphere of pressure is directed against plate 26. The resulting force will shove piston head 24 forward in cylinder 21. As the piston head 24 moves forward, it will compress gas phase 29 and force the gas through supply line 23 into the liquid 30. Since the low solubility gas will dissolve in liquid 30 only slightly, it will provide a gas cushion in cylinder 21 which will absorb the impact force on plate 26. Following an impact, device 20 can be restored to its original condition in the same manner as described above for device 10, that is, by releasing the force applied against plate 26.

In the practice of this invention, many combinations of liquids and gases may be used to provide an operable energy absorbing system. One of the general properties that the liquid phase must have is that it must be a substance which is a liquid at temperatures between about −50° and 150°F., and at pressures ranging from atmospheric pressure up to about 50,000 p.s.i. This will include substances which are single liquids or a mixture of liquids.

For the gas phase, the substance must be either a single gas or a mixture of gases, which will remain in the gas phase at the temperatures and pressures recited above. Another property of the gas phase is that it must be chemically inert to the liquid phase. Another property of the gas phase is that is must be essentially insoluble in the liquid phase at atmospheric pressure, but at least partially soluble at higher pressures. More specifically, with regard to solubility, the gas phase must contain at least one gas which has low solubility in the liquid at the recited temperatures and pressures. To explain further, if a mixture of gases are used, each gas in the mixture should be essentially insoluble in the liquid at atmospheric pressure. In the same system, however, at least one gas should be only slightly soluble in the liquid at the highest pressure at which the system will be expected to operate.

For the liquid phase, certain organic liquids and mixtures of these liquids may be used. A preferred organic liquid is propylene carbonate. Propylene carbonate is especially suitable because of its ability to dissolve several different gases and because it is a liquid over a wide temperature range (freezing point, −49.2°C. and boiling point, 241.7°C.). Other suitable organic liquids include ethylene carbonate, polyglycol ethers, N-alkylated pyrollidones, acetone, methanol, dimethyl formamide, sulfolane, alkanolamines, and alkyl or alkenyl esters of keto acids. Suitable mixtures of these liquids which may be used are propylene carbonate or ethylene carbonate, in combination with the alkyl keto acid esters.

Gases suitable for use in the energy absorbing system of this invention are selected on the basis of known solubility in one or more of the organic liquids recited above. Typical of gases which will dissolve in these liquids are hydrogen sulfide, carbon dioxide, carbon monoxide, carbonyl sulfide, sulphur dioxide, and nitrogen. Gases which are particularly suitable as having low solubility in the above mentioned liquids, are nitrogen, carbon monoxide, argon, neon, helium, and krypton. An especially preferred system comprises a mixture of hydrogen sulfide, carbon dioxide, and nitrogen, as the gas phase, in combination with propylene carbonate, as the liquid phase.

Each of the following examples describes an energy absorbing device, as shown in the drawing. For the purpose of illustrating the invention, each device is described as it might operate in the bumper assembly of a vehicle. It is understood, however, that the invention is not limited to the application described herein.

EXAMPLE I

This example relates to the device shown in FIG. 1. For simplicity in the illustration, only one absorber unit is shown in the drawing. A complete absorber unit is defined by the combination of the closed container 10 and slidable piston 14. The data in this example, however, is based on the use of two absorber units.

Each cylinder portion 11 in the closed container 10 has a bore of 1 inch and the stroke travel of the piston 14 is 4 inches. The entire cylinder volume of each absorber unit, therefore, is 51cc. Each absorber unit contains 51cc. of propylene carbonate, as a liquid phase 18, or a total liquid volume of 102cc. For the gas phase 19, the chamber portion 12 of each absorber unit contains a total volume of 3,500cc. of nitrogen.

In this example, assume that an impact force of 10,000 p.s.i. is applied against the energy contact plate 15. At the full impact force of 10,000 p.s.i., about 2,500 cc. of the nitrogen gas would be dissolved in the liquid phase. The remaining 1,000 cc. of undissolved nitrogen would serve as an absorber cushion. When the applied pressure on the gas-liquid phase is released, the system will return to atmospheric pressure. When this happens the dissolved nitrogen 2,500cc will come out of solution, and the system is again restored to its original condition.

EXAMPLE II

This example relates to the device shown in FIG. 2. A complete absorber unit is defined by the closed cylinder 21, supply line 23, and slidable piston 24. Only one absorber unit is shown in the drawing, but the data of this example is based on the use of four units. The supply line 23 of each of the four absorber units connects each unit into a common surge tank 22.

Each cylinder 21 has a bore of 4 inches and the stroke travel of piston 24 is 6 inches. The total cylinder volume of each absorber unit, therefore, is 1,235cc. Each supply line 23 measures ¼ inch inside diameter by 8 feet in length, for a volume of 19.25cc. The total volume, therefore, for the four absorber units is 5,017cc. The surge tank 22 contains a total volume of 10cc. propylene carbonate, as the liquid phase 30.

For the gas phase 29, a mixture of hydrogen sulfide, carbon dioxide, and nitrogen, is used. Specifically, the total volume of gas for the four absorber units comprises 2,000cc. hydrogen sulfide, 2,500cc. carbon dioxide, and 500cc. nitrogen. For the first part of this example, assume that an impact force of 7,000 p.s.i. is applied against the energy contact plate 26.

At this impact level all of the $H_2S$ 2,000cc. would be dissolved in the liquid phase at a pressure of about 2,000 p.s.i. At 6,500 p.s.i., all of the $CO_2$ (2,500cc) would be dissolved. At the full impact pressure of 7,500 p.s.i., about 25cc. of the nitrogen gas would be dissolved. This would leave about 475cc. undissolved nitrogen, as an absorber cushion.

For the second part of this example, assume that the impact force applied against plate 26 is 40,000 p.s.i. Under this impact force all of the hydrogen sulfide gas and the carbon dioxide gas would be dissolved in the liquid phase, once the pressure exceeds about 6,500 p.s.i. At the full impact pressure of 40,000 p.s.i., about 200cc. of the nitrogen gas would be dissolved. The remaining absorber cushion, therefore, would be about 300cc. of nitrogen gas.

EXAMPLE III

This example also relates to the device shown in FIG. 2. In this example, the surge tank 22 contains a total volume of 10cc. propylene carbonate as the liquid phase 30. The gas phase 30 comprises a mixture of carbon dioxide, total volume 3,000cc., and nitrogen, total volume 500cc. For the first part of this example, assume that the impact force against the energy contact plate 26 is 15,000 p.s.i.

Under this impact force the entire 3,000cc. of carbon dioxide gas would be dissolved in the liquid phase at a pressure of about 7,500 p.s.i. At the full impact pressure of 15,000 p.s.i., only 25cc. of the nitrogen gas would be dissolved in the liquid phase. This would leave a reserve of about 475cc. of undissolved nitrogen as an absorber cushion. The remaining nitrogen gas cushion would be capable of absorbing an additional force of 50,000 p.s.i.

For the second part of this example, assume that the impact force against plate 26 is 300 p.s.i. At the full impact force of 300 p.s.i., about 90cc. of the carbon dioxide gas would be dissolved in the liquid phase, but none of the nitrogen gas would dissolve in the liquid. The remaining absorber cushion, therefore, would comprise about 2,910cc. of the undissolved carbon dioxide and the entire 500cc. of undissolved nitrogen.

The invention claimed is:

1. In a method for absorbing and releasing energy, the steps which comprise:
   storing in a closed container a substance which is a liquid phase at atmospheric pressure and at a temperature of from about −50° to 150°F;
   storing in the same closed container a substance which is a gas phase at atmospheric pressure and at the recited temperature range, which is chemically inert to the liquid phase, and which is essentially insoluble in the liquid phase at atmospheric pressure;
   applying to the liquid-gas phase a positive pressure which is above one atmosphere of pressure, at the recited temperature range, to partially dissolve the gas phase in the liquid phase; and
   reducing the pressure on the liquid-gas phase to a condition of atmospheric pressure, to permit the partially dissolved gas phase to come out of solution.

2. The method of claim 1 in which the liquid phase is a member of the group consisting of an organic liquid, and a mixture of organic liquids.

3. The method of claim 1 in which the liquid phase is a member of the group consisting of propylene carbonate, ethylene carbonate, polyglycol ethers, N-alkylated pyrollidones, acetone, methanol, dimethyl formamide, sulfolane, alkanolamines, alkyl or alkenyl esters of keto acids, and mixtures of the recited liquids.

4. The method of claim 1 in which:
   the gas phase includes a first gas phase and a second gas phase;
   the first gas phase comprises one or more gases which are highly soluble in the liquid phase at a temperature between −50° and +150°F., and at a pressure which is above one atmosphere of pressure; and
   the second gas phase comprises one or more gases which are essentially insoluble in the liquid phase at the recited temperature, and at a pressure which is above one atmosphere of pressure.

5. The method of claim 4 in which the first gas phase comprises one or more gases selected from the group consisting of hydrogen sulfide, carbon dioxide, carbon monoxide, carbonyl sulfide, and sulfur dioxide.

6. The method of claim 4 in which the second gas phase comprises one or more gases selected from the group consisting of nitrogen, helium, argon, neon, and carbon monoxide.

7. The method of claim 1 in which the liquid phase is propylene carbonate and the gas phase is nitrogen.

8. In a method for absorbing and releasing energy, the steps which comprise:
   storing in a closed container, at atmospheric pressure and at a temperature of from about −50° to +150°F., a quantity of propylene carbonate, as a liquid phase;
   storing in the same closed container, at atmospheric pressure and at a temperature of from about −50° to +150°F., a quantity of hydrogen sulfide, carbon dioxide, and nitrogen, as a gas phase;
   applying to the liquid-gas phase a positive pressure which is above one atmosphere of pressure, and which is sufficient to completely dissolve the hydrogen sulfide and the carbon dioxide in the propylene carbonate and to partially dissolve the nitrogen in the propylene carbonate; and
   reducing the pressure on the liquid-gas phase to a condition of atmospheric pressure, to permit the partially dissolved gas phase to come out of solution.

* * * * *